US011264014B1

(12) United States Patent
McNeill et al.

(10) Patent No.: US 11,264,014 B1
(45) Date of Patent: Mar. 1, 2022

(54) AUDIO DEVICE AND METHOD OF AUDIO PROCESSING WITH IMPROVED TALKER DISCRIMINATION

(71) Applicant: Plantronics, Inc., Santa Cruz, CA (US)

(72) Inventors: Iain McNeill, Aptos, CA (US); Matthew Neves, Freedom, CA (US); Gavin Radolan, Merritt Island, FL (US)

(73) Assignee: PLANTRONICS, INC., Santa Cruz, CA (US)

( * ) Notice: Subject to any disclaimer, the term of this patent is extended or adjusted under 35 U.S.C. 154(b) by 68 days.

(21) Appl. No.: 16/570,924

(22) Filed: Sep. 13, 2019

Related U.S. Application Data (60) Provisional application No. 62/735,160, filed on Sep. 23, 2018.

(51) Int. Cl.
| | | |
|---|---|---|
| *G10L 15/20* | (2006.01) | |
| *G10L 25/21* | (2013.01) | |
| *G10L 15/22* | (2006.01) | |
| *G10L 25/84* | (2013.01) | |
| *G10L 25/18* | (2013.01) | |

(52) U.S. Cl.
CPC .............. *G10L 15/20* (2013.01); *G10L 15/22* (2013.01); *G10L 25/18* (2013.01); *G10L 25/21* (2013.01); *G10L 25/84* (2013.01)

(58) Field of Classification Search
CPC ......... G10L 15/20; G10L 15/22; G10L 25/18; G10L 25/21; G10L 25/84
See application file for complete search history.

(56) References Cited

U.S. PATENT DOCUMENTS

| | | | | |
|---|---|---|---|---|
| 5,485,524 A | * | 1/1996 | Kuusama ............ | G10L 21/0208 333/14 |
| 7,039,179 B1 | * | 5/2006 | Gerhardt ................ | H04M 1/05 379/387.01 |
| 7,197,456 B2 | * | 3/2007 | Haverinen .............. | G10L 15/20 704/226 |
| 7,376,558 B2 | * | 5/2008 | Gemello ............. | G10L 21/0208 704/226 |

(Continued)

OTHER PUBLICATIONS

Equivalent Rectangular Bandwidth, https://ccrma.stanford.edu/~jos/bbt/Equivalent_Rectangular_Bandwidth.html, 4 pages, Oct. 29, 2020.

(Continued)

*Primary Examiner* — Mohammad K Islam
(74) *Attorney, Agent, or Firm* — Slayden Grubert Beard PLLC (57) ABSTRACT

An audio device for improved talker discrimination is provided. To improve suppression of close talker interference, i.e., of a person talking in close proximity to the user of the audio device, the audio device comprises at least an audio input to receive a voice input signal; a filter bank, configured to provide a plurality of sub-band signals from the voice input signal; a multi-band audio expander, arranged to receive at least a group of the sub-band signals and configured to conduct audio expansion on the group of sub-band signals to provide gain-controlled sub-band signals; and an audio output, configured to provide a voice output signal from at least the gain-controlled sub-band signals.

19 Claims, 6 Drawing Sheets

(56) References Cited

U.S. PATENT DOCUMENTS

| | | | | |
|---|---|---|---|---|
| 8,213,598 | B2* | 7/2012 | Bendersky | H04B 3/23 |
| | | | | 379/406.14 |
| 8,271,279 | B2* | 9/2012 | Hetherington | G10L 21/0216 |
| | | | | 704/233 |
| 8,798,992 | B2* | 8/2014 | Gay | G10L 21/028 |
| | | | | 704/226 |
| 8,914,282 | B2* | 12/2014 | Konchitsky | G10L 21/0208 |
| | | | | 704/226 |
| 9,043,203 | B2* | 5/2015 | Rettelbach | G10L 19/028 |
| | | | | 704/226 |
| 9,088,328 | B2* | 7/2015 | Gunzelmann | H04B 1/1036 |
| 9,202,463 | B2* | 12/2015 | Newman | G10L 15/22 |
| 9,613,612 | B2* | 4/2017 | Perkmann | G10K 11/17861 |
| 9,711,130 | B2* | 7/2017 | Hendrix | G10K 11/17855 |
| 9,792,897 | B1* | 10/2017 | Kaskari | G10L 15/02 |
| 9,959,886 | B2* | 5/2018 | Anhari | G10L 25/78 |
| 10,339,949 | B1* | 7/2019 | Dusan | G10L 21/0208 |
| 10,355,658 | B1* | 7/2019 | Yang | H03G 3/002 |
| 2009/0265169 | A1* | 10/2009 | Dyba | G10L 19/012 |
| | | | | 704/233 |
| 2013/0332175 | A1* | 12/2013 | Setiawan | G10K 11/16 |
| | | | | 704/500 |
| 2014/0126733 | A1* | 5/2014 | Gauger, Jr. | G10K 11/17821 |
| | | | | 381/71.6 |
| 2014/0162731 | A1* | 6/2014 | Helsloot | H04B 15/00 |
| | | | | 455/570 |
| 2014/0214676 | A1* | 7/2014 | Bukai | G10L 17/04 |
| | | | | 705/44 |
| 2015/0302845 | A1* | 10/2015 | Nakano | G10L 13/02 |
| | | | | 704/267 |
| 2016/0077794 | A1* | 3/2016 | Kim | G06F 3/167 |
| | | | | 704/275 |
| 2017/0200444 | A1* | 7/2017 | O'Connell | G10K 11/17885 |
| 2018/0190307 | A1* | 7/2018 | Hetherington | G06F 3/167 |
| 2019/0222943 | A1* | 7/2019 | Andersen | G10L 25/84 |

OTHER PUBLICATIONS

Coherence (signal processing, https://en.wikipedia.org/wiki/Coherence_(signal_processing), 2 pages, Oct. 29, 2020.

"Dual Microphone Adaptive Noise reduction Software," *VOCAL*, White Paper, 8 pages, Dec. 15, 2015.

Gustafsson et al.; "Dual-Microphone Spectral Subtraction" University of Kaklskrona/Ronneby, 37 pages, 2000.

Jeub et al., "Noise Rediuction for Dual-Micrphone Mobile Phones Exploiting Power Level Differences" Institute of Communication Systems and Data Processing, 4 pages, 2012.

Ray Chien, A Coherence-Based Algorithm for Noise Reduction in Dual-Microphone Applications, TONIC Lab, 18 pages, Oct. 29, 2020.

Leo L. Beranek, "Acoustics" 1993 Edition, 25 pages, 1954.

Hugo Fastl et al., "Psychoacoustics Facts and Models" Chapter 8, 22 pages, Aug. 2006.

Hugo Fastl et al., "Psychoacoustics Facts and Models" Chapter 6, 16 pages, Aug. 2006.

Hugo Fastl et al., "Psychoacoustics Facts and Models" Chapter 5, 23 pages, Aug. 2006.

Hugo Fastl et al., "Psychoacoustics Facts and Models" Chapter 4, 28 pages, Aug. 2006.

Hugo Fastl et al., "Psychoacoustics Facts and Models" Chapter 3, 22 pages, Aug. 2006.

* cited by examiner

AUDIO DEVICE AND METHOD OF AUDIO PROCESSING WITH IMPROVED TALKER DISCRIMINATION

CROSS REFERENCE TO RELATED APPLICATION

This application claims priority to U.S. Provisional Patent Application No. 62/735,160, entitled "Multi Band Expander for Transmit Close Talker Discrimination", filed on Sep. 23, 2018 with the United States Patent and Trademark Office, the contents of which are hereby incorporated by reference in their entireties.

FIELD OF INVENTION

This invention relates to audio devices and digital audio processing methods, such used in telecommunications applications.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

A problem exists when an audio device, such as a mobile phone or headset, is used in a noisy environment. In these scenarios, it may be difficult for the microphone of the audio device to capture the voice of the device user sufficiently, while keeping the picked up noise at a minimum for increased speech clarity. Particularly problematic are situations, where another person is talking close by. A typical scenario where other persons are talking close by is in a call center environment. While call center workers may use headsets to bring the microphone close to the respective user's mouth, even typical headset microphones may not be able to sufficiently discriminate between the user, i.e., the headset wearer, and another person talking in close proximity. In addition, in some environments, even a highly directional microphone may be unable to distinguish between the actual headset wearer and another talker who is located on-axis, but further away. This problem is referred to as "close talker interference."

Prior art solutions utilize a noise gate (center clipper) that attenuates all mic signals below a certain threshold. While this can be tuned to effectively cut out background noises of all kinds in the silence between the user's utterances, it may produce a pumping or surging effect when the user starts talking. If the microphone is not optimally positioned close to the user's mouth, then the noise gate can even cut off initial and/or trailing speech components which degrades intelligibility and efficiency.

Historically, directional microphones have been used to reduce ambient noise pickup, but these are only effective in the directions of their nulls, e.g., to the sides with bidirectional microphones and away from the mouth with cardioid mics. They do little to eliminate interfering speech coming close to the microphone pick up axis.

SUMMARY

Accordingly, an object is given to provide an audio device and a method of audio processing with improved talker discrimination, in particular for close talker interference.

In general and in one exemplary aspect, an audio device with improved talker discrimination is provided. The audio device of this aspect comprises at least an audio input to receive a voice input signal; a filter bank, configured to provide a plurality of sub-band signals from the voice input signal; a multi-band audio expander, arranged to receive at least a group of the sub-band signals and configured to conduct audio expansion on the group of sub-band signals to provide gain-controlled sub-band signals; and an audio output, configured to provide a voice output signal from at least the gain-controlled sub-band signals.

One basic idea of the above aspect is to improve suppression of close talker interference, i.e., of a person talking in close proximity to the user of the audio device, by performing multi-band audio expansion on a plurality of sub-band signals of a voice input signal. The provided solution allows efficient suppression of close talker interference, while reducing gain switching that may result in a disturbing pumping effect.

The details of one or more embodiments are set forth in the accompanying drawings and the description below. Other aspects, features, and advantages will be apparent from the description, drawings, and from the claims.

DETAILED DESCRIPTION

The details of one or more embodiments are set forth in the accompanying drawings and the description below. Other features will be apparent from the description, drawings, and from the claims.

Specific embodiments of the invention are here described in detail, below. In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In the following explanation of the present invention according to the embodiments described, the terms "connected to" or "connected with" are used to indicate a data and/or audio (signal) connection between at least two components, devices, units, processors, circuits, or modules. Such a connection may be direct between the respective components, devices, units, processors, circuits, or modules; or indirect, i.e., over intermediate components, devices, units, processors, circuits, or modules. The connection may be permanent or temporary; wireless or conductor based.

For example, a data and/or audio connection may be provided over a direct connection, a bus, or over a network connection, such as a WAN (wide area network), LAN (local area network), PAN (personal area network), BAN (body area network) comprising, e.g., the Internet, Ethernet networks, cellular networks, such as LTE, Bluetooth (classic, smart, or low energy) networks, DECT networks, ZigBee networks, and/or Wi-Fi networks using a corresponding suitable communications protocol. In some embodiments, a USB connection, a Bluetooth network connection, and/or a DECT connection is used to transmit audio and/or data.

In the following description, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between like-named elements. For example, a first element is distinct from a second element, and the first element may encompass more than one element and succeed (or precede) the second element in an ordering of elements.

Discussed herein are devices and methods to address close talker interference using a multi-band expansion technique. As discussed in the preceding, when an audio device, such as a mobile phone or headset, is used in a noisy environment, it may be difficult for the microphone of the audio device to capture the voice of the device user sufficiently, while keeping the picked up noise at a minimum for increased speech clarity. Particularly problematic are situations, where another person is talking close by, referred to as "close talker interference" herein.

In one aspect, an audio device with improved talker discrimination is provided. The audio device may be of any suitable type. In some embodiments, the audio device is a telecommunication audio device, e.g., a headset, a phone, a speakerphone, a mobile phone, a communication hub, or a computer, configured for telecommunication.

In the context of this application, the term "headset" refers to all types of headsets, headphones, and other head worn audio devices, such as for example circumaural and supra aural headphones, ear buds, in ear headphones, and other types of earphones. The headset may be of mono, stereo, or multichannel setup. The headset in an embodiment may comprise an audio processor. The audio processor may be of any suitable type to provide output audio from an input audio signal. The audio processor may, e.g., comprise hardwired circuitry and/or programming for providing the described functionality. For example, the audio processor may be a digital signal processor (DSP).

The audio device of this aspect comprises at least an audio input to receive a voice input signal. The audio input may be of any suitable type for receiving the voice input signal, the latter of which may be an audio signal that contains a user's voice or speech during use.

The terms "signal" and "audio signal" in the present context are used interchangeably and refer to an analogue or digital representation of audio in time or frequency domain. For example, the audio signals described herein may be of pulse code modulated (PCM) type, or any other type of bit stream signal. Each audio signal may comprise one channel (mono signal), two channels (stereo signal), or more than two channels (multichannel signal). The audio signal may be compressed or not compressed. The audio signal may be coded or uncoded.

In some embodiments, the audio input comprises one or more microphones to capture the user's voice. The microphones may be of any suitable type, such as dynamic, condenser, electret, ribbon, carbon, piezoelectric, fiber optic, laser, or MEMS type. At least one of the microphones is arranged so that it captures the voice of the user, wearing the audio device. One or more of the microphones may be omnidirectional or directional.

In some embodiments, the audio input is connectable to one or more microphones to capture the user's voice. In these embodiments, the one or more microphones may be placed in the vicinity of the audio device for capturing the user's voice "near-end". Alternatively, the one or more microphones may be placed at a location, remote to the audio device for capturing the user's voice at a "far-end".

In case that the audio input comprises or is connectable to more than one microphone, the audio input in some embodiments may be configured to process the microphone signals to obtain the voice input signal from the multiple microphone signals, e.g., using a mixer.

The audio device further comprises a filter bank, configured to provide a plurality of sub-band signals from the voice input signal, and a multi-band audio expander, arranged to receive at least a group of the sub-band signals and configured to conduct audio expansion on the group of sub-band signals to provide gain-controlled sub-band signals.

The term "audio expansion" herein is understood with its typical meaning, namely to expand the dynamic range of an audio signal. Any signal below a threshold is expanded downwards by a specified ratio, i.e., it is attenuated. For example, if an expansion ratio is 2:1 and the signal drops 3 dB below the threshold, an additional 3 dB of attenuation would be applied to the output signal such that the signal level will be reduced to 6 dB below the threshold.

By splitting the voice input signal into several frequency bands and performing expansion (i.e., gain reduction below a threshold level) on these bands, it is possible to attenuate speech utterances of close talkers in the user's vicinity efficiently without the negative effects of gain switching.

The filter bank and the multi-band audio expander of the present aspect may be of any suitable type. In some embodiments, the aforesaid components are made of discrete electronic components. In some embodiments, the aforesaid components are integrated in one or more semiconductors. For example, the filter bank and/or the multi-band audio expander may be integrated with an audio processor, such as a DSP.

The filter bank may provide any number of sub-band signals. Generally, the number may be selected in dependence of the application. Some embodiments in this respect are discussed in the following in more detail.

In some embodiments, the processing by the filter bank and the multi-band audio expander is conducted in the frequency domain. In this case, e.g., the voice input signal may be processed using a Fast Fourier transform (FFT) by filter bank or using a separate component, i.e., an FFT circuit.

The audio device of the present aspect further comprises an audio output, configured to provide a voice output signal from at least the gain-controlled sub-band signals. The audio output may in some embodiments be configured to combine the gain-controlled sub-band signals and any pass-through sub-band signals, as discussed in the following, to obtain the voice output signal. The audio output may in some embodiments be configured to provide the voice output signal in a digital or analog format to a further component or device.

For example, the audio output may comprise a wired or wireless communication interface to transmit the voice output signal to the further component or device.

In some embodiments, an inverse FFT circuit is arranged in the signal path between the multi-band audio expander and the audio output to transform at least the gain-controlled sub-band signals and any pass-through sub-band signals back to the time domain and to thus to obtain a recombined time-domain signal. It is noted that the inverse FFT circuit may in some embodiments be arranged as part of the multi-band expander, the audio output and/or the sound processor. The FFT circuit and/or the inverse FFT circuit may be implemented using software executed on a processing device, hard-wired logic circuitry, or a combination thereof.

It is noted that the term "module" as used herein may refer to a collection of routines, functions, and/or data structures that perform a particular task or implements a particular abstract data type. Modules may be composed of two parts: 1) an interface that lists the constants, data types, variables, and routines/functions that can be accessed by other modules, devices, or routines/functions and 2) an implementation that is typically private, accessible only to that module, and includes source code that actually implements the routines/functions in the module. The term "module" may also simply refer to an application, such as a computer program, to assist in the performance of a specific task. In other examples, at least part of the module may be implemented by hard-wired logic, hardware, or other circuitry.

As discussed in the preceding, the multi-band audio expander is configured to process at least a group of the plurality of sub-band signals, provided by the filter bank. While in some embodiments, the multi-band audio expander is configured to conduct audio expansion on each of the plurality of sub-band signals, in some alternative embodiments, the multi-band audio expander is configured to conduct audio expansion on a smaller subset of the plurality of sub-band signals, i.e., not all of the plurality of sub-band signals. For example, the lowest and highest bands of the audible frequency spectrum may not be subject to audio expansion, since typically, no substantial close talker interference may be present in these sub-bands. Accordingly, in some embodiments, the respective one or more sub-band signals may be passed through from the filter bank to the audio output or the inverse Fast Fourier transform circuit either directly or via intermediate components without audio expansion being conducted by the multi-band audio expander on these sub-bands. In some embodiments, the one or more sub-band signals that pass through without audio expansion are subjected to spectral subtraction for noise reduction or to a different type of noise reduction for a further improved talker discrimination.

The audio device in further embodiments may comprise additional components. For example, the audio device in one exemplary embodiment may comprise additional control circuitry, additional circuitry to process audio, a wireless communications interface, a central processing unit, one or more housings, and/or a battery.

In some embodiments, the multi-band audio expander is configured for separate audio expansion on each sub-band signal of the received group of sub-band signals. A corresponding, individual audio expansion is beneficial for a further increased attenuation or suppression of close talker interference.

In some embodiments, the multi-band audio expander is configured with at least one of a configurable expansion threshold, a configurable expansion ratio (also referred to as "expansion factor"), a configurable attack time constant, and a configurable release time constant. In the present context, "configurable" is understood to encompass run-time adjustability as well as allowing to provide pre-configuration, e.g., by the manufacturer, operator, or user.

In some embodiments, the multi-band audio expander is configured so that at least one of a configurable expansion threshold, a configurable expansion ratio, a configurable attack time constant, and a configurable release time constant is configurable for each of the group of sub-band signals. In other words, the present embodiments allow individual control of one or more of the aforesaid audio expander parameters for each of the group of sub-band signals.

As discussed in the preceding, the filter bank may provide any number of sub-band signals. Correspondingly and in some embodiments, the filter bank may be provided with configurable filter band edge frequencies, and hence, e.g., configurable sub-band signal bandwidths. For example and in case an FFT is conducted, the sub-band signal bandwidth may be selected as an integer of the respective FFT bin-width, e.g., with a 128 point FFT at 16 ksamples/sec, as a multiple of 125 Hz. In alternative embodiments, 64 or 256 point FFT may be conducted, resulting in 4 and 16 ms latency, respectively.

In some embodiments, the filter bank provides at least 5 or 8 sub-band signals. In some embodiments, the filter bank provides at least 12 or 16 sub-band signals. In some embodiments, the filter bank provides sub-band signals of a bandwidth of at least 250 Hz.

In some embodiments, the filter bank is configured to provide one or more of the sub-band signals to match psychoacoustic bands, i.e., as identified in the field of psychoacoustics to have an influence on noise perception. In these embodiments, at least some sub-band signals may be formed to correspond to the "critical bands" as defined in Psychoacoustics: Facts and Models: By Hugo Fastl, Eberhard Zwicker (Springer Verlag; 3rd edition (Dec. 28, 2006)).

In some embodiments, the audio device further comprises an average power detector, configured to determine an average power for each sub-band signal of the group of sub-band signals. The determination of the average power detector may in some embodiments be continuous or at least repetitive. In some embodiments, the average power is calculated for each sub-band signal as an exponential average with two-sided smoothing.

In some embodiments, the multi-band audio expander is configured to conduct audio expansion on at least one of the group of sub-band signals when the average power of the respective sub-band signal corresponds to an expansion threshold. In other words, the multi-band audio expander uses the average power as determined by the average power detector for controlling the audio expansion. The expansion threshold in some embodiments may be set individually per sub-band signal, per subset of sub-band signals, or common for the entire group of sub-band signals.

It is noted that the term 'corresponds to' in this context comprises the cases of 'equal to' and/or 'lower than'.

In some embodiments, the multi-band audio expander is additionally configured for gain smoothing, i.e., adapting gain settings for adjacent sub-bands. The present embodiment provides linear interpolation to smooth the gains of adjacent sub-bands to increase the quality of the voice output signal. It is noted that the term 'gain' herein is understood with its usual meaning in electronics, namely a measure of the ability of a circuit to increase the power or amplitude of a signal. A gain smaller than one means an attenuation of the signal.

In some embodiments, the audio device further comprises a silence detector connected with the multi-band expander, which silence detector is configured to control the multi-band audio expander when voice silence determined.

The present embodiments provide a further increased quality of the voice output signal. The silence detector may be configured to determine whether or not the user is talking. If the user should not be talking, i.e., the voice input signal comprises only background noise as well as close talker interference, referred herein as a state of "voice silence", the silence detector controls the multi-band audio, e.g., to provide a constant signal level and/or to prevent impulsive ambient noise or loud parts of unwanted speech from breaking through for example by controlling the expansion factor(s) or by controlling the expansion threshold(s) of the multi-band audio expander.

The silence detector may be of any suitable type. For example, the silence detector may comprise a non-voice activity detector, as known in the art. In another example, the silence detector determines voice silence based on a determination of average power.

The silence detector in some embodiments may enhance the operation of the multi-band audio expander by temporarily controlling the sub-band expander thresholds to an elevated threshold level. The present embodiments may provide that, when the ambient noise is loud, it does not get modulated by the expander, which would make it more noticeable and distracting.

In some embodiments, the silence detector is configured to determine voice silence when the average power for each sub-band signal of the group of sub-band signals is below an average silence signal level for a predetermined time period or sample number, such as about 1000 samples, resulting in a predetermined time period of 62.5 ms.

In some embodiments, the silence detector is configured to set an expansion threshold of the multi-band expander for each of the sub-band signals of the group of sub-band signals to a common silence threshold when voice silence is determined. As will be apparent, the present embodiments provide that the expansion threshold is commonly set for the group of sub-band signals if voice silence is detected. In some embodiments, the expansion threshold may be set relatively high, so that essentially all sub-band signals of the group of sub-band signals are attenuated. This is beneficial, as during voice signal silence, no user speech is present in the voice input signal.

For example, if voice silence is detected, the expansion threshold is set to a common silence threshold, which common silence threshold is higher than an operating expansion threshold, applied during normal operation, i.e., when the user is talking. As will be apparent to one of skill in the art, the higher threshold in an audio expander during voice silence provides that essentially more of the voice input signal is attenuated, since any signal below the threshold is expanded downwards, i.e., is attenuated.

In some embodiments, the audio device further comprises an instantaneous power detector, wherein the silence detector is connected with the average power detector and the instantaneous power detector, and wherein the instantaneous power detector is configured to determine an instantaneous power of the voice input signal, i.e., the "full-band" instantaneous power.

The determination of the instantaneous power detector may in some embodiments be continuous or at least repetitive. In some embodiments, the determination of instantaneous power is the power in a 4 ms FFT window or frame. It may be calculated in the frequency domain although it could also be calculated in the time domain as the two are equivalent as described in Parsevals theorem.

In some embodiments, the silence detector is configured to release control of the multi-band audio expander, e.g., the expansion factor(s) or expansion threshold(s) in case the instantaneous full-band power of the voice input signal exceeds an instantaneous silence signal level. In this case, the operation of the multi-band audio expander returns to its previous state using its previous settings.

The determination of the instantaneous full-band power of the voice input signal exceeding the instantaneous silence signal level corresponds to an end of voice silence. The use of the instantaneous full-band power of the voice input signal is beneficial to provide a fast attack, so that the user's utterances are not cut off.

Conversely and in some embodiments, the silence detector may be configured so as to not release the control of the expansion factor for sudden loud impulse noises, for example for noise emanating from a dropped item or person coughing.

In some embodiments, the silence detector is a speech-band level detector with a fast rise time and slow fall time. The fall time should be long enough that the silence detector does not trigger in the gaps between normal speech, typically 100-200 ms, and the rise time should be short enough that the beginning of an utterance is not cut off, typically 20-50 ms.

In some embodiments, the audio device further comprises a voice harmonics detector, connected and/or integrated with the multi-band expander. In some embodiments, the voice harmonics detector is configured to determine a fundamental sub-band signal from the group of sub-band signals that comprises a fundamental voice component.

In this context, the term "fundamental voice component" is understood to comprise at least the fundamental frequency of the user's voice when speaking. In a typical scenario, the fundamental frequency of an adult male may be in the range of 85 Hz to 180 Hz, while the fundamental frequency of an adult female may be in the range of 165 Hz to 255 Hz.

In some embodiments, the voice harmonics detector is further configured to determine one or more harmonics sub-band signals from the group of sub-band signals that comprise harmonics voice components of the fundamental voice component. In other words, the voice harmonics detector may be configured to determine one or more harmonics of the harmonic series of the user's voice. In some embodiments, the voice harmonics detector determines the next 4 harmonics and the associates sub-band signals.

In some embodiments, the voice harmonics detector is configured to control the multi-band expander so that one or more of expansion factor and expansion threshold of the one or more harmonics sub-band signals correspond to one or more of expansion factor and expansion threshold of the fundamental sub-band signal. This serves to "link" the attenuation in the fundamental sub-band signal to the attenuation in the one or more harmonics sub-band signals and thus further increases the quality of the voice output signal by preventing filtering of the wanted speech by the expander that would cause unnatural sound due to changes in the spectral balance of the voice.

In some embodiments and to speed up the opening of the expander at the onset of speech utterance, the multi-band audio expander is configured so that the maximum attenuation for each sub-band signal of the group of sub-band signals is implemented so that it only provides to the attenuation necessary to prevent the transmission of unwanted speech. By limiting the maximum attenuation, there is less attenuation to remove once the speech utterance starts and so the opening of the expander is speeded up and the change in gain is not so noticeable. In this way, a gain change delta may be minimized and time reduced.

In some embodiments, the multi-band audio expander is user-configurable during operation. For example, two presets may be selectable, namely 'basic' and 'increased'. In some embodiments, the 'basic' preset provides an expansion factor of 2:1, i.e., a relatively mild or smooth attenuation. In some embodiments, the 'increased' preset provides a higher expansion ratio than the 'basic preset. Alternatively or additionally to changing the ratio and some embodiments, the threshold may be user configurable, e.g., using the preceding presets.

According to a further aspect, an audio processor for improved talker discrimination is provided. The audio processor is configured to receive a voice input signal and the audio processor comprising at least a filter bank, configured to provide a plurality of sub-band signals from the voice input signal; and a multi-band audio expander, arranged to receive at least a group of the sub-band signals and configured to conduct audio expansion on the group of sub-band signals to obtain gain-controlled sub-band signals. The audio processor of this aspect may be of any suitable type and may comprise hard-wired circuitry and/or programming for providing the described functionality. For example, the audio processor may be a digital signal processor (DSP) such as those currently available on the market or a custom analog integrated circuit such as an Application Specific Integrated Circuit (ASIC).

The audio processor according to the present aspect and in further embodiments may be configured according to one or more of the embodiments, discussed in the preceding with reference to the preceding aspect. With respect to the terms used for the description of the present aspect and their definitions, reference is made to the discussion of the preceding aspect.

According to another aspect, a method of audio processing for improved talker discrimination is provided. The method comprises at least providing a plurality of sub-band signals from a voice input signal; and conducting audio expansion on at least a group of the sub-band signals to provide gain-controlled sub-band signals.

The method according to the present aspect and in further embodiments may be configured according to one or more of the embodiments, discussed in the preceding with reference to the preceding aspects. With respect to the terms used for the description of the present aspect and their definitions, reference is made to the discussion of the preceding aspects.

The systems and methods described herein may in some embodiments apply to narrowband (8 kS/s) and/or wideband (16 kS/s) and/or superwideband (24/32/48 kS/s) implementations. The systems and methods described herein in some embodiments may provide adjustable filter band edge frequencies (and hence bandwidths). The systems and methods described herein may in some embodiments provide adjustable thresholds, attack & release time constants, and/or expansion ratios for each band. The systems and methods described herein may in some embodiments provide a multi-band expander (gain control) block that may be used on its own. The systems and methods described herein may achieve a latency of less than 6 ms.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate figures. It is further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

Figure 1:
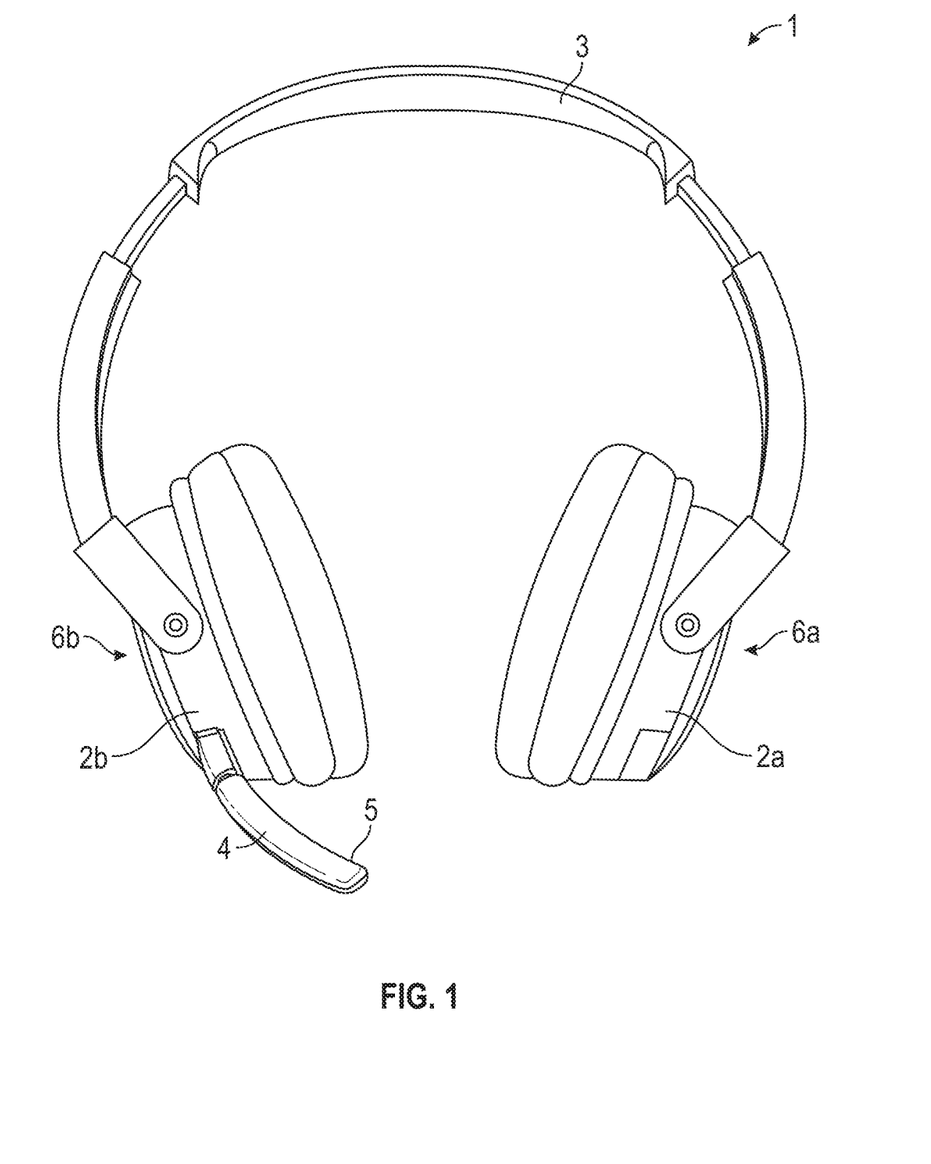
FIG. 1 shows an embodiment of an audio device with improved talker discrimination, namely of a headset.

FIG. 1 shows an embodiment of an audio device with improved talker discrimination, namely of a headset 1. The headset 1 comprises two earphones 2a, 2b with speakers 6a, 6b. The two earphone housings 2a, 2b are connected with each other over headband 3. A microphone 5 is arranged on microphone boom 4.

The headset 1 is intended for wireless telecommunication and is connectable to a host device, such as a mobile phone, desktop phone communications hub, computer, etc., over a cable, Bluetooth, DECT, or other wired or wireless connection.

Figure 2:
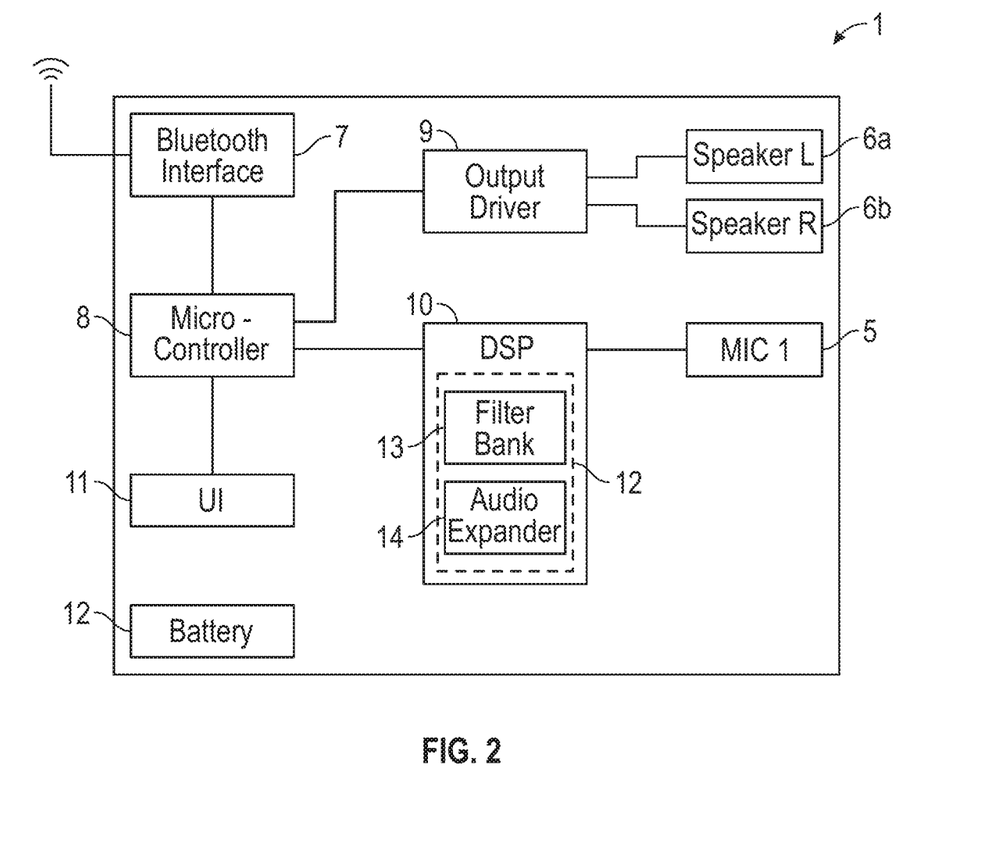
FIG. 2 shows a schematic block diagram of the headset according to the embodiment of FIG. 1.

FIG. 2 shows a schematic block diagram of the headset 1 according to the embodiment of FIG. 1 implemented as a Bluetooth wireless headset. Besides the already mentioned speakers 6a, 6b and the microphone 5, the headset 1 comprises a Bluetooth interface 7 for connection with the aforementioned host device. A microcontroller 8 is provided to control the connection with the host device. Incoming audio, received via the host device is provided to output driver circuitry 9, which comprises a D/A converter, and an amplifier. Audio, captured by the microphone 5, herein referred to as voice input signal, is processed by a digital signal processor (DSP) 10, as will be discussed in further detail in the following. A voice output signal is provided by the DSP 10 to the microcontroller 8 for transmission to the host device.

In addition to the above components, a user interface 11 allows the user to adjust settings of the headset 1, such as ON/OFF state, volume, etc. Battery 12 supplies operating power to all of the aforementioned components. It is noted that no connections from and to the battery 12 are shown so as to not obscure the FIG. All of the aforementioned components are provided in the earphone housings 2a, 2b.

As discussed in the preceding, headset 1 is configured for improved talker discrimination. In the present context, the improved talker discrimination is primarily provided by the processing of DSP 10, which receives a voice input signal from microphone 5 and provides a processed voice output signal that shows improved talker discrimination.

Improved talker discrimination in the context of this embodiment means that a (far-end) communication participant, receiving the (near-end) recorded voice of the user of headset 1, can more easily understand the voice of the user, even in the case of other talkers close by, such as in a call center environment.

As will be apparent from FIG. 2, DSP 10 comprises a talker discrimination processing circuit 12. The circuit 12 may be provided using hard-wired circuitry, programming/software running on DSP 10, or a combination thereof. Main components of talker discrimination processing circuit 12 are a filter bank 13 and a multi-band audio expander 14.

Filter bank 13 provides a plurality of sub-band signals from the voice input signal and multi-band audio expander 14 receives at least a subset of these sub-band signals and processes the subset of signals by audio expansion.

One underlying idea of this setup is that by splitting the microphone voice input signal into several frequency bands and performing individual expansion on these bands, i.e., gain reduction below an expansion threshold, the benefits or a more aggressive noise gate are achieved without gain switching, while providing close talker attenuation even when the headset user is talking.

Figure 3:
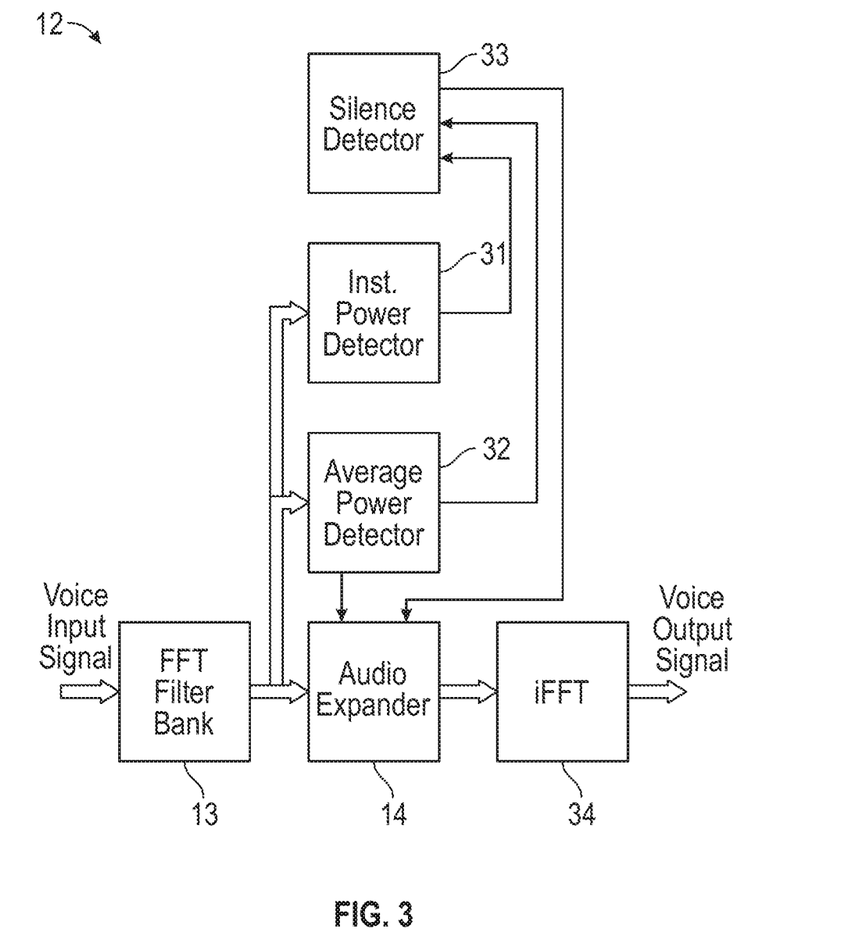
FIG. 3 shows a schematic block diagram of a talker discrimination processing circuit for use in the embodiment of FIGS. 1 and 2.

FIG. 3 shows a schematic block diagram of talker discrimination processing circuit 12. The voice input signal, as received from microphone with or without intermediate processing, is provided to FFT (Fast Fourier Transform) filter bank 13, which samples the voice input signal over time and divides it into its frequency components. It is noted that the further processing is conducted in the frequency domain until the signal is being converted back to the time domain by synthesis filter bank 34, performing inverse Fourier transform to provide a time-domain voice output signal.

The filter bank 13 provides a number of sub-band signals from the voice input signal corresponding to an integer number of FFT bins. For example, a 128-point FFT at 16 k samples/sec has an FFT bin-width of 16000/128=125 Hz. The minimum bandwidth of a sub-band signal thus is 125 Hz. Other possible widths would be 62.5 Hz, 250 Hz, 325 Hz, etc., i.e., any width constructible from an integer number of FFT bins. The sub-band setup, i.e., the number of overall FFT bins/sub-band signals, can be tuned either to save cycles, or to improve audio quality. The impact on quality may be subtle. It is noted that a given sub-band signal may include one or more FFT bins. In other words, the sub-band signals may span over a single or a plurality of FFT bins, depending on the application.

The number and bandwidths of the sub-bands may be modified, e.g., using the user interface 11. For reasons of clarity, connections for parameter control are not shown in FIG. 3.

In this embodiment, a number of 16 sub-band signals are generated from the FFT-converted voice input signal. The frequency bands are configured to correspond to the "critical bands" as defined in Psychoacoustics: Facts and Models: By Hugo Fastl, Eberhard Zwicker (Springer Verlag; 3rd edition (Dec. 28, 2006)). Table 1 below provides one exemplary embodiment of 16 bins, i.e., sub-band signals, the corresponding frequency range, and thresholds for the audio expander 14 in decimal and decibel notation. The table is stored in memory (not shown) of DSP 10 and thus is configurable in dependence of the application.

TABLE 1

| Bin edge | Frequency Range | | Thres (Dec) | Thres (dB) |
|---|---|---|---|---|
| 2 | 0 | 250 | 8192 | −12 |
| 4 | 251 | 500 | 8192 | −12 |
| 6 | 501 | 750 | 8192 | −12 |
| 8 | 751 | 1000 | 8192 | −12 |
| 10 | 1001 | 1250 | 8192 | −12 |
| 12 | 1251 | 1500 | 8192 | −12 |
| 14 | 1501 | 1750 | 8192 | −12 |
| 16 | 1751 | 2000 | 4096 | −18 |
| 19 | 2001 | 2375 | 4096 | −18 |
| 24 | 2376 | 3000 | 4096 | −18 |
| 30 | 3001 | 3750 | 2048 | −24 |
| 37 | 3751 | 4625 | 2048 | −24 |
| 46 | 4626 | 5750 | 2048 | −24 |
| 51 | 5751 | 6375 | 1024 | −30 |

TABLE 1-continued

| Bin edge | Frequency Range | | Thres (Dec) | Thres (dB) |
|---|---|---|---|---|
| 58 | 6376 | 7250 | 1024 | −30 |
| 65 | 7251 | 8125 | 1024 | −30 |

The most critical frequency range for speech in a narrowband audio application is defined from 300 Hz to 3 kHz. In the present embodiment, a wideband audio application is discussed and the critical frequency range extends from 300 Hz up to 8 kHz.

The sub-band signals are passed from the filter bank 13 to an instantaneous power detector 31, an average power detector 32, and to multi-band audio expander 14.

The instantaneous power detector 31 calculates full-band power, i.e., power over the entire voice input signal, in the time domain using the samples in the FFT analysis window, e.g., using 64 samples/16 kHz=4 ms sample time. The instantaneous power is used by silence detector 33, as discussed in more detail in the following.

The average power detector 32 determines an average power in each of the sub-band signals. The corresponding average power values are used by the silence detector 33 and by the multi-band audio expander 14. The average power detector 32 determines an exponential averaging and 2-sided smoothing. Attack and release parameters may be programmable. For example, 10 ms attack time and 15 ms release time may be used to balance fast response time of the expanders and silence detector with the dynamics of speech.

The multi-band audio expander 14 is configured for audio expansion, as discussed. Thus, when the average power of a given sub-band signal is below an expansion threshold, this sub-band signal is attenuated by an expansion factor or expansion ratio. While generally, the expansion ratio may be selected according to the application, e.g., between 2:1 to 8:1, an expansion ratio of 2:1 may provide the least distortion to the wanted speech from the headset wearer whilst providing good attenuation of unwanted sounds.

Exemplary expansion thresholds for each sub-band signal are shown in Table 1. The expansion thresholds are determined by the amplitude level of the long-term speech average spectrum. The thresholds are sub-band thresholds, such that 16384 means −6 dB, 8192 means −12 dB, and so on. Certainly, both threshold and ratio/factor are configurable in dependence of the application. In addition, the audio expander 14 comprises configurable attack and release parameters, which are time constants and may be, for example, 4 ms attack and 50 ms release. In this embodiment, the audio expander 14 uses 2-sided exponential time-smoothing.

The resulting gain changes in each of the sub-bands, are "smoothed" by these attack and release time constants to prevent the generation of artifacts such as clicks and pops and defined by the well-known exponential response equation $A=A_0 * e^{(-t/\tau)}$ where tau is the time constant.

Silence detector 33 is used to determine voice silence, i.e., a state where the headset user is not speaking. The voice input signal in this state comprises just background noise including close talker interference, which may comprise impulsive noise, disturbing to the receiving party. In such a scenario, impulsive ambient noise could open up the expander causing a noise burst to be transmitted. The silence detector 33 in essence exploits the difference between the impulsive nature of noises such as items being dropped, people coughing or sneezing, ringtones, and other machine notification tones and the relatively slow envelope of speech. The silence detector allows the audio expander 14 to ignore sudden or impulse sounds and to freeze the expander 14 until the next speech envelope is detected.

Figure 4:
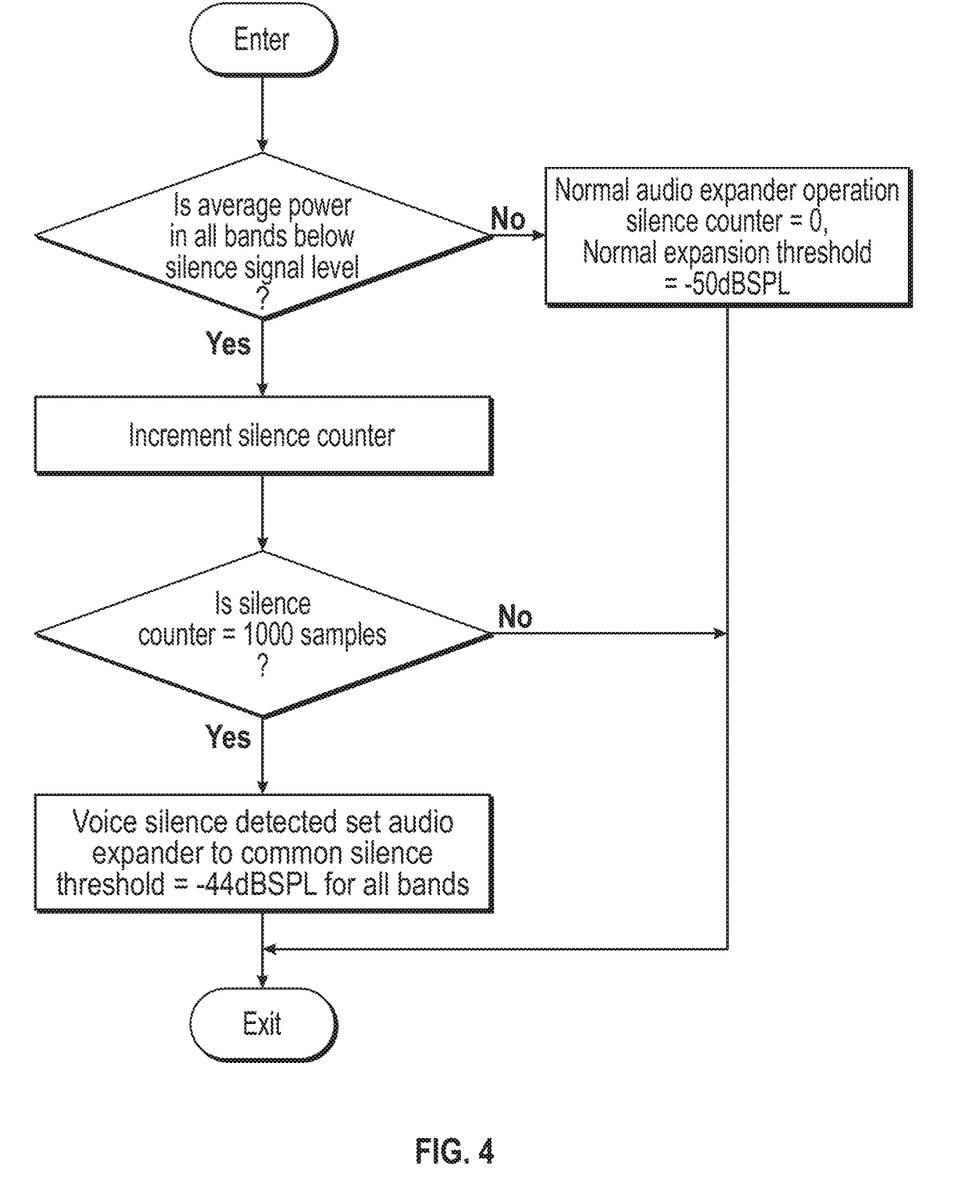
FIG. 4 shows a flow-chart of the operation of a silence detector.

More precisely, the silence detector 33 detects "voice silence" when the average power in all sub-band signals is beneath a configurable silence signal level, i.e. a threshold, for 1000 FFT samples, i.e., 62.5 ms. When this happens, the silence detector 33 controls the multi-band audio expander 14 to a common silence threshold, so that an aggressive attenuation (20 dB) of all sub-band signals is provided. In particular, it is noted that during this state, all sub-band signals are equally attenuated by the common silence threshold. FIG. 4 shows a flow-chart of the operation of the silence detector 33.

The multi-band audio expander 14 stays in the voice silence state with aggressive attenuation until the instantaneous full-band power in indicates that user speech is present. Then, the multi-band audio expander 14 is controlled by the silence detector 33 to return to normal operation. In this way, the response time, to "wake up" from a silence period is still very fast.

After the processing of the multi-band audio expander 14, the synthesis filter 34 combines the sub-band signals and converts back to the time domain. The voice output signal may then be subjected to further processing or provided directly to the far-end communication participant.

To improve the operation of the multi-band audio expander 14 further, an optional frequency smoothing algorithm may be applied to the sub-band signals in addition to the time-smoothing via the attack and release parameters. This may include a linear-interpolation applied to smooth the expansion factors between adjacent sub-bands, which may improve audio quality. As an option, turning off smoothing, or using a simplified smoothing, may save resources, such as cycles and/or power.

To speed up the opening of the multi-band audio expander at the onset of speech utterance, a maximum attenuation for each sub-band expander may be implemented so that only the attenuation necessary is applied to prevent the transmission of unwanted speech. In this way, a gain change delta may be minimized and the control of the expanders expedited.

Figure 5:
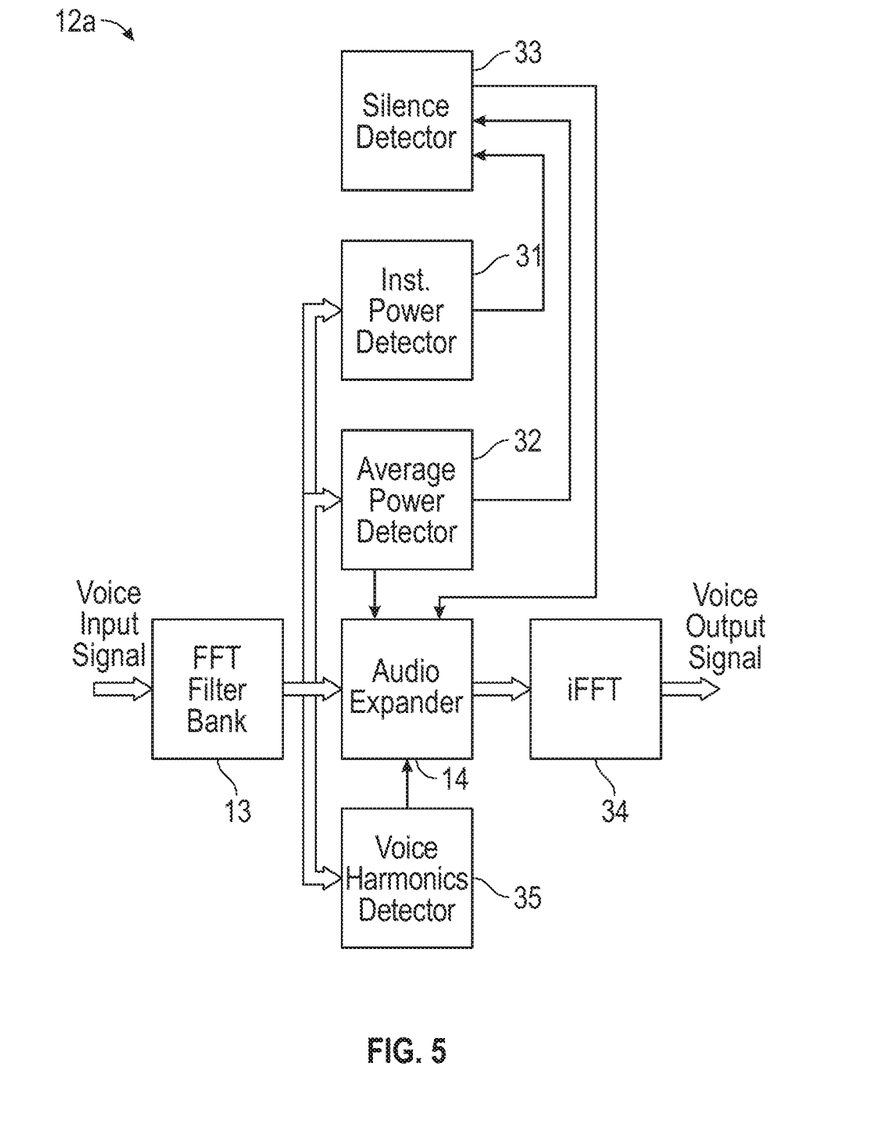
FIG. 5 shows another schematic block diagram of a talker discrimination processing circuit having a voice harmonics detector.

FIG. 5 shows another embodiment of talker discrimination processing circuit 12a. The circuit corresponds to the talker discrimination processing circuit 12 of FIG. 3 with the exception that DSP 10 additionally comprises a voice harmonics detector 35 that is arranged to receive the sub-band signals from the FFT filter bank 13 and furthermore configured to control the multi-band audio expander 14.

The operation of the voice harmonics detector 35 is based on the fact that all voices have many harmonics that are related to a fundamental by a simple integer factor. By identifying the lowest frequency bin with speech energy in it, the harmonic bins related to the fundamental may be dynamically linked and the expansion factors (i.e., the attenuation provided) may move in step, thereby eliminating an unequal attenuation of voiced harmonics characterizing a particular person's voice.

Accordingly, the voice harmonics detector 35 is configured to determine a sub-band signal comprising the fundamental frequency of the user's voice, determine the sub-band signals, comprising a number of harmonics of the user's voice, and control the multi-band expander so that expansion factor and expansion threshold of the determined sub-band signals comprising the fundamental and the harmonics frequencies match each other. In other words, voice harmonics detector 35 serves to link the attenuation in the fundamental sub-band signal to the attenuation in the harmonics sub-band signals.

As will be apparent the number of harmonics that the voice harmonics detector 35 searches for may be configurable depending on the application, e.g., considering the available processing power of DSP 10, battery consumption, etc.

Figure 6:
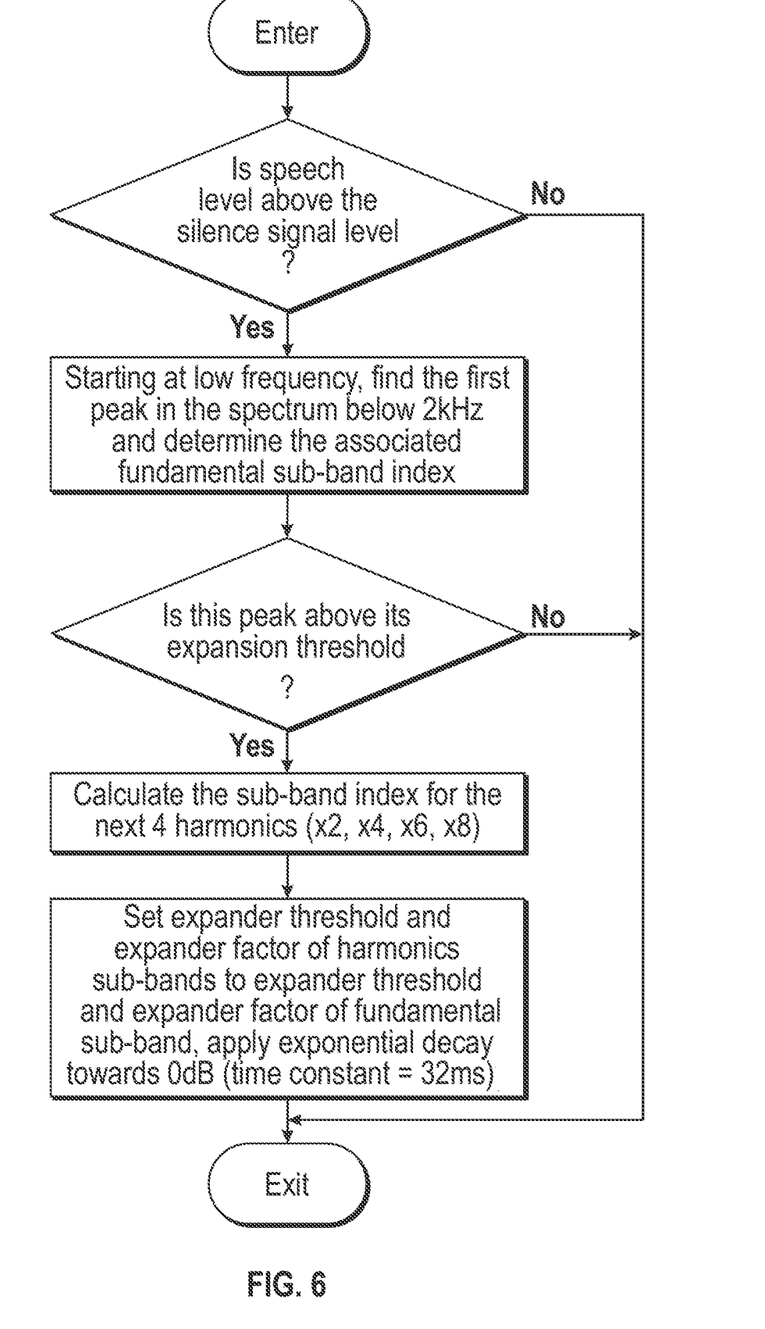
FIG. 6 shows a flow-chart of the operation of the voice harmonics detector of FIG. 5.

FIG. 6 is a flow chart illustrating the operation of the voice harmonics detector 35. The linking of the expansion factors to stabilize speech audio quality may be performed in lieu of or in addition to adjacent band linking, described in the preceding.

The systems and methods described herein will prove critical for call centers and headset users dealing with private information, such as medical and financial records.

While the invention has been illustrated and described in detail in the drawings and foregoing description, such illustration and description are to be considered illustrative or exemplary and not restrictive; the invention is not limited to the disclosed embodiments. For example, it is possible to operate the invention in any of the preceding embodiments, wherein instead of the audio device being provided as a headset, the audio device being formed as a body-worn or head-worn audio device such as smart glasses, a cap, a hat, a helmet, or any other type of head-worn device or clothing;

the output driver 9 comprises noise cancellation circuitry for the speakers 6a, 6b; and/or instead of or in addition to Bluetooth interface 7, one or more of a DECT interface, a WiFi interface, a cable interface, a QD (quick disconnect) interface, a USB interface, an Ethernet interface, or any other type of wireless or wired interface is provided;

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module, or other unit may fulfill the functions of several items recited in the claims.

The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. An audio device with improved talker discrimination, the audio device comprising at least an audio input to receive a voice input signal;

a filter bank, configured to provide a plurality of sub-band signals from the voice input signal;

a multi-band audio expander, arranged to receive at least a group of the sub-band signals and configured to conduct audio expansion on the group of sub-band signals to provide gain-controlled sub-band signals;

the audio device further comprising a voice harmonics detector connected with the multi-band expander, wherein the voice harmonics detector is configured to determine a fundamental sub-band signal from the group of sub-band signals that comprises a fundamental voice component;

determine one or more harmonics sub-band signals from the group of sub-band signals that comprise harmonics voice components of the fundamental voice component; and control the multi-band expander so that one or more of expansion factor and expansion threshold of the one or more harmonics sub-band signals correspond to one or more of expansion factor and expansion threshold of the fundamental sub-band signal to link an attenuation in the fundamental sub-band signal to an attenuation in the one or more harmonics sub-band signals; and an audio output, configured to provide a voice output signal from at least the gain-controlled sub-band signals.

2. The audio device of claim 1, wherein the multi-band audio expander is configured for separate audio expansion on each of the group of sub-band signals.

3. The audio device of claim 1, wherein the multi-band audio expander is configured with at least one of a configurable expansion threshold and a configurable expansion ratio.

4. The audio device of claim 3, wherein at least one of the expansion threshold and the expansion ratio is configurable for each of the group of sub-band signals.

5. The audio device of claim 1, wherein the filter bank provides at least eight sub-band signals and wherein the multi-band audio expander conducts audio expansion on the at least eight sub-band signals.

6. The audio device of claim 1, wherein the filter bank is configured to provide one or more of the sub-band signals to match psychoacoustic bands.

7. The audio device of claim 1, further comprising an average power detector, connected to the multi-band audio expander, the average power detector being configured to determine an average power for each sub-band signal of the group of sub-band signals.

8. The audio device of claim 7, wherein the multi-band audio expander is configured to conduct audio expansion on at least one of the group of sub-band signals when the average power of the respective sub-band signal corresponds to an expansion threshold.

9. The audio device of claim 1, wherein the multi-band audio expander is configured for gain smoothing.

10. The audio device of claim 1, further comprising a silence detector connected with the multi-band expander, which silence detector is configured to control the multi-band audio expander when voice silence is determined.

11. The audio device of claim 7, wherein the silence detector is configured to determine voice silence when the average power for each sub-band signal of the group of sub-band signals is below an average silence signal level.

12. The audio device of claim 10, wherein the silence detector is configured to set an expansion threshold of the multi-band expander for each of the sub-band signals of the group of sub-band signals to a common silence threshold when voice silence is determined.

13. The audio device of claim 7, further comprising an instantaneous power detector, wherein the silence detector is connected with the average power detector and the instantaneous power detector, and wherein the instantaneous power detector is configured to determine an instantaneous power of the voice input signal.

14. The audio device of claim 13, wherein the silence detector is configured to release control of the multi-band audio expander when the instantaneous power of the voice input signal exceeds an instantaneous silence signal level.

15. The audio device of claim 1, wherein the audio input comprises or is connectable to at least one microphone.

16. The audio device of claim 1, wherein the audio device is a communication audio device.

17. The audio device of claim 1, wherein the audio device is a headset.

18. A method of audio processing for improved talker discrimination, the method comprising:

providing, using a filter bank, a plurality of sub-band signals from a received voice input signal;

conducting, using a multi-band audio expander, audio expansion on at least a group of the sub-band signals to provide gain-controlled sub-band signals;

determining a fundamental sub-band signal from the group of sub-band signals that comprises a fundamental voice component;

determining one or more harmonics sub-band signals from the group of sub-band signals that comprise harmonics voice components of the fundamental voice component;

controlling the multi-band expander so that one or more of expansion factor and expansion threshold of the one or more harmonics sub-band signals correspond to one or more of expansion factor and expansion threshold of the fundamental sub-band signal to link an attenuation in the fundamental sub-band signal to an attenuation in the one or more harmonics sub-band signals; and providing, at an audio output, a voice output signal from at least the gain-controlled sub-band signals.

19. A non-transitory computer-readable medium including contents that are configured to cause a processing device to conduct the steps:

providing, using a filter bank, a plurality of sub-band signals from a received voice input signal;

conducting, using a multi-band audio expander, audio expansion on at least a group of the sub-band signals to provide gain-controlled sub-band signals;

determining a fundamental sub-band signal from the group of sub-band signals that comprises a fundamental voice component;

determining one or more harmonics sub-band signals from the group of sub-band signals that comprise harmonics voice components of the fundamental voice component;

controlling the multi-band expander so that one or more of expansion factor and expansion threshold of the one or more harmonics sub-band signals correspond to one or more of expansion factor and expansion threshold of the fundamental sub-band signal to link an attenuation in the fundamental sub-band signal to an attenuation in the one or more harmonics sub-band signals; and providing, at an audio output, a voice output signal from at least the gain-controlled sub-band signals.

* * * * *